(12) United States Patent
Rao et al.

(10) Patent No.: US 12,010,124 B2
(45) Date of Patent: Jun. 11, 2024

(54) METHODS AND SYSTEMS FOR PREVENTION OF VENDOR DATA ABUSE

(71) Applicants: Supreeth Hosur Nagesh Rao, Cupertino, CA (US); Navindra Yadav, Cupertino, CA (US); Ravi Sankuratri, Cupertino, CA (US); Alok Lalit Wadhwa, Milipitas, CA (US); Aria Rahadian, San Jose, CA (US); Bharathwaj Sankara Viswanathan, Mountain View, CA (US); Brady Schulman, Milford, NH (US); Matthew Finn, Lebanon, GA (US); Ravi Shanker Prasad, Fremont, CA (US); Vasil Dochkov Yordanov, San Jose, CA (US); Yiwei Wang, San Jose, CA (US); Zhiwen Zhang, San Jose, CA (US)

(72) Inventors: Supreeth Hosur Nagesh Rao, Cupertino, CA (US); Navindra Yadav, Cupertino, CA (US); Ravi Sankuratri, Cupertino, CA (US); Alok Lalit Wadhwa, Milipitas, CA (US); Aria Rahadian, San Jose, CA (US); Bharathwaj Sankara Viswanathan, Mountain View, CA (US); Brady Schulman, Milford, NH (US); Matthew Finn, Lebanon, GA (US); Ravi Shanker Prasad, Fremont, CA (US); Vasil Dochkov Yordanov, San Jose, CA (US); Yiwei Wang, San Jose, CA (US); Zhiwen Zhang, San Jose, CA (US)

( * ) Notice: Subject to any disclaimer, the term of this patent is extended or adjusted under 35 U.S.C. 154(b) by 218 days.

(21) Appl. No.: 17/335,932

(22) Filed: Jun. 1, 2021

(65) Prior Publication Data

US 2022/0269815 A1    Aug. 25, 2022

Related U.S. Application Data

(60) Provisional application No. 63/153,362, filed on Feb. 24, 2021.

(51) Int. Cl.
*H04L 9/40*  (2022.01)
*G06F 9/54*  (2006.01)
(Continued)

(52) U.S. Cl.
CPC .......... *H04L 63/1416* (2013.01); *G06F 9/541* (2013.01); *G06F 16/2379* (2019.01);
(Continued)

(58) Field of Classification Search
CPC .. G06F 21/6245; G06F 9/541; G06F 16/2379; H04L 63/0209
See application file for complete search history.

(56) References Cited

U.S. PATENT DOCUMENTS 9,722,895 B1 * 8/2017 Sarukkai ................. H04L 67/10
9,998,470 B1 * 6/2018 Hockings .............. G06F 21/556
(Continued)

*Primary Examiner* — Thaddeus J Plecha

(57) ABSTRACT

In one aspect, a computerized method for automatically identifying and solving for vendor data abuse in an enterprise network, includes the step of implementing a vendor detection at one or more gateways of the enterprise network. The method includes the step of mapping a set of data along with any associated data attributes of the set of data that are being shared with a vendor via the one or more gateways. The method includes the step of detecting and identifying an access anomaly with respect to the set of data associated with a vendor access. The method includes the step of implementing a specified data minimization process to the access anomaly.

12 Claims, 5 Drawing Sheets

(51) Int. Cl.
   *G06F 16/23*      (2019.01)
   *G06F 21/57*      (2013.01)
   *G06F 21/60*      (2013.01)
   *G06F 21/62*      (2013.01)

(52) U.S. Cl.
   CPC .......... *G06F 21/577* (2013.01); *G06F 21/604* (2013.01); *G06F 21/6245* (2013.01); *H04L 63/0209* (2013.01); *H04L 63/1425* (2013.01); *H04L 63/1466* (2013.01); *H04L 63/20* (2013.01); *G06F 2221/034* (2013.01)

(56) References Cited

U.S. PATENT DOCUMENTS

| | | | |
|---|---|---|---|
| 10,917,401 B1* | 2/2021 | Mantin | H04L 63/1441 |
| 2015/0339497 A1* | 11/2015 | Kurian | G06F 21/60 |
| | | | 726/34 |
| 2016/0140466 A1* | 5/2016 | Sidebottom | G06Q 10/0635 |
| | | | 705/7.28 |
| 2017/0061123 A1* | 3/2017 | Parker-Wood | G06F 21/556 |
| 2018/0330257 A1* | 11/2018 | Dodson | G06F 21/554 |
| 2021/0036854 A1* | 2/2021 | Dunjic | H04L 9/3213 |
| 2022/0247768 A1* | 8/2022 | Datar | H04L 63/1416 |

\* cited by examiner

METHODS AND SYSTEMS FOR PREVENTION OF VENDOR DATA ABUSE

CLAIM OF PRIORITY

This application claims priority to U.S. Provisional Patent Application No. 63/153,362, filed on 24 Feb. 2021 and titled DATA PRIVACY AND ZERO TRUST SECURITY CENTERED AROUND DATA AND ACCESS, ALONG WITH AUTOMATED POLICY GENERATION AND RISK ASSESSMENTS. This provisional patent application is incorporated herein by reference in its entirety.

FIELD OF INVENTION

This application related to cloud-platform security and more specifically to an implementing prevention of vendor data abuse.

BACKGROUND

Data security is now multi dimensional. Every day enterprises produce an overwhelming amount and variety of data that can create data sprawl. Data sprawl is a real issue affecting data security. With the growing number of operating systems, data warehouses, enterprise and mobile applications, data sprawl is becoming a problem. Data and access is now spread across SaaS products, vendors, and cloud-service providers, etc. Due to this sprawl, securing enterprises or preventing data loss needs a multi-dimensional context. A specific very prevalent problem is that of vendor data abuse. Enterprises have their data compromised due to bad posture around cloud security or data that was shared with vendors. Accordingly, improvements to methods of security enterprise data and preventing vendor data abuse are desired.

SUMMARY OF THE INVENTION

In one aspect, a computerized method for automatically identifying and solving for vendor data abuse in an enterprise network, includes the step of implementing a vendor detection at one or more gateways of the enterprise network. The method includes the step of mapping a set of data along with any associated data attributes of the set of data that are being shared with a vendor via the one or more gateways. The method includes the step of detecting and identifying an access anomaly with respect to the set of data associated with a vendor access. The method includes the step of implementing a specified data minimization process to the access anomaly.

Figure 1:
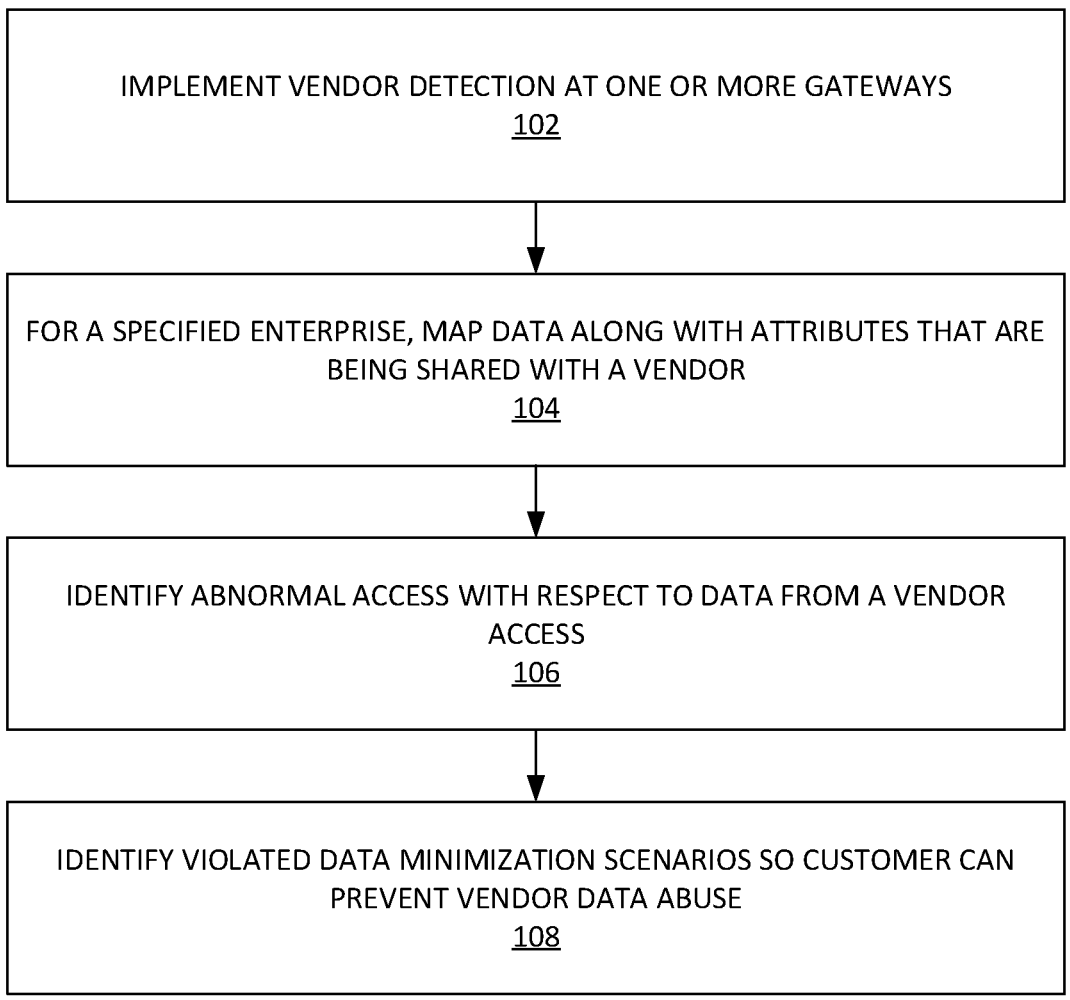
FIG. 1 illustrates an example process solving for vendor data abuse, according to some embodiments.

The Figures described above are a representative set and are not exhaustive with respect to embodying the invention.

DESCRIPTION

Disclosed are a system, method, and article for implementing prevention of vendor data abuse. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to 'one embodiment,' 'an embodiment,' 'one example,' or similar language means that a particular feature, structure, or characteristic described in connection with the embodiment is included in at least one embodiment of the present invention. Thus, appearances of the phrases 'in one embodiment,' 'in an embodiment,' and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Ambassador is an API Gateway for cloud-native applications that routes traffic between heterogeneous services and maintains decentralized workflows. Ambassador can be a single-entry point and supports tasks (e.g. service discovery, configuration management, routing rules, and rate limiting).

Application programming interface (API) can be a computing interface that defines interactions between multiple software intermediaries. An API can define the types of calls and/or requests that can be made, how to make them, the data formats that should be used, the conventions to follow, etc. An API can also provide extension mechanisms so that users can extend existing functionality in various ways and to varying degrees.

Envoy is an L7 proxy and communication bus designed for large modern service-oriented architectures.

Fingerprinting is a procedure that maps an arbitrarily large data item (e.g. a computer file) to a much shorter bit string (i.e. the fingerprint), that uniquely identifies the original data for all practical purposes.

Gateway is a node in a computer network that passes traffic from a local network to other networks or the Internet (e.g. via a router).

Machine learning (ML) can use statistical techniques to give computers the ability to learn and progressively improve performance on a specific task with data, without being explicitly programmed. Machine learning is a type of artificial intelligence (AI) that provides computers with the ability to learn without being explicitly programmed. Machine learning focuses on the development of computer programs that can teach themselves to grow and change when exposed to new data. Example machine learning techniques that can be used herein include, inter alia: decision tree learning, association rule learning, artificial neural networks, inductive logic programming, support vector machines, clustering, Bayesian networks, reinforcement learning, representation learning, similarity, and metric learning, and/or sparse dictionary learning.

Personal data (PII) can be personally identifiable information. PII data can be information that can be used on its own or with other information to identify, contact, or locate a single person, or to identify an individual in a specified context.

Sensitive information is something that scores high in sensitivity like PII data of data subjects, code, patents, personnel information, keys, certifications etc.

Sidecar proxy is an application design pattern that abstracts specified features. For example, Sidecars can handle interservice communications, monitoring, and security-related concerns. These are abstracted away from the main architecture to ease the tracking and maintenance of the application as a whole. In some examples, a service mesh can be implemented by providing an instance of a sidecar proxy for each service instance.

Software as a service (SaaS) is a software licensing and delivery model in which software is licensed on a subscription basis and is centrally hosted.

Example Methods

FIG. 1 illustrates an example process 100 solving for vendor data abuse, according to some embodiments. In step 102, process 100 implements vendor detection at one or more gateways of an enterprise network. In step 104, process 100, for a specified enterprise, maps the data along with the data attributes that are being shared with a vendor.

In step 106, process 100 identifies abnormal access with respect to data from a vendor access. This access anomaly can be used to implement specified data minimization principles. These data minimization principles can be applied for every vendor sharing agreement engaged in by the enterprise.

In step 108, process 100 then identifies violated data minimization scenarios so customers can prevent vendor data abuse.

As used herein, data minimization can be effectuated in various ways. These can include, inter alia: limiting collection, use, disclosure, retention, identifiability, sensitivity, and access to sensitive data (e.g. PII, etc.). Data minimization can include limiting the data collected by protocol elements to only what is necessary (e.g. utilizing specified collection limitation techniques). In some examples, process 100 can provide limits to the use or retention of data.

Figure 2:
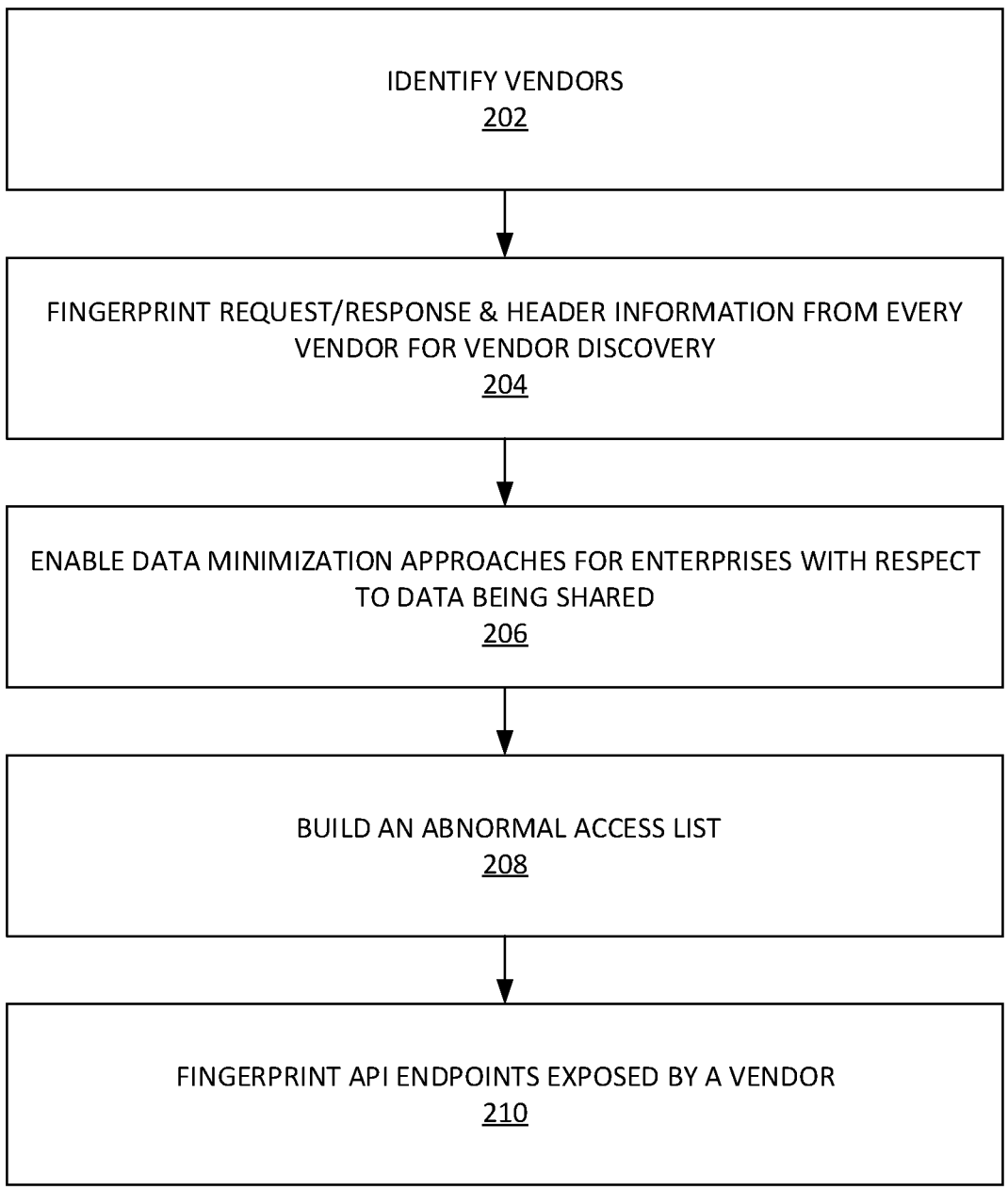
FIG. 2 illustrates an example process for monitoring network traffic on a gateway, according to some embodiments.

FIG. 2 illustrates an example process 200 for monitoring network traffic on a gateway, according to some embodiments. Process 200 can also monitor network traffic as a sidecar proxy (e.g. on Envoy proxy, Ambassador systems, etc.). In this way, process 200 can assist an enterprise with various vendor data abuse scenarios.

In step 202, process 200 can identify vendors based off, inter alia: an API endpoint, an API paths, a location, and a region information. In step 204, process 200 can fingerprint request/response and header information from every vendor for vendor discovery. In step 206, process 200 can enable data minimization approaches for enterprises with respect to data being shared (e.g. see infra).

In step 208, process 200 can build an abnormal access list with respect to, inter alia: API paths, contents of API for a vendor API key, etc. In step 210, process 200 can fingerprint API endpoints exposed by a vendor. Additionally, process 200 can fingerprint method types to obtain vendor identification and associating with the calls from/to the enterprise.

Example Systems

Figure 3:
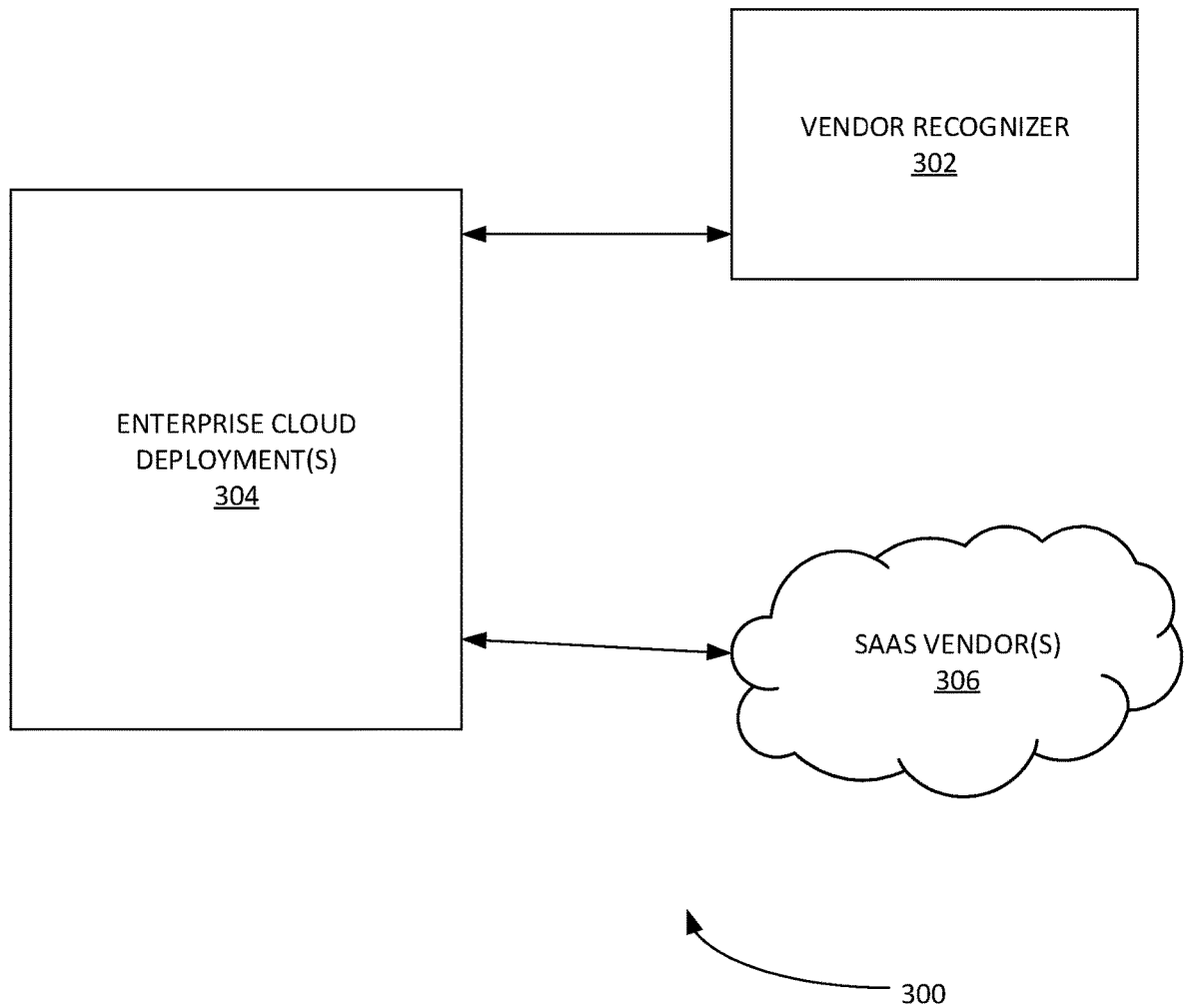
FIG. 3 illustrates an example system for preventing vendor data abuse, according to some embodiments.

FIG. 3 illustrates an example system 300 for preventing vendor data abuse, according to some embodiments. System 300 can be used to identify and/or find anomalies. System 300 can ensure data minimization with respect to vendor data sharing.

Vendor recognizer module 304 is a module installed in the gateway(s) of system 300. Vendor recognizer module 304 can be a side car proxy (e.g. in Envoy® and/or Ambassador®). With the vendor recognizer module 304, system 300 can automatically identify a vendor that an enterprise is using from within its cloud environments (e.g. as enterprise cloud deployments 302, etc.). Vendor recognizer module 304 can use any information that vendors make available with respect to the regions and IPS on which they expose the service. Along with this information, vendor recognizer module 304 also profiles the actual API calls including API calling methods such as, inter alia: GET, POST, PUT, DELETE, etc. Vendor recognizer module 304 can also provide any actual request/response payloads of popular SaaS vendor 306 APIs.

An example of how system 300 is implemented to obtain the IP/region info for Auth0 is now discussed. It is noted that Auth0 allows you to authenticate and authorize apps and APIs with any identity provider running on any stack on any device or cloud-computing platform. System 300 analyzes the traffic going in-out of any enterprise deployments 302. For all of this network traffic, the vendor recognizer module 304 recognizes the Auth0 and also the regions.

Vendor recognizer module 304 can add a various dimensions to a vendor profile (e.g. vendor identifiers, vendor location, etc.). In cases, where there is no clear vendor qualification parameter(s), vendor recognizer module 304 can use the following example qualification parameters: IP of the resolved CNAME on an API; API Paths; API method results (e.g. GET, POST, PUT, DELETE, etc.); Request/Response of the APIs; etc. vendor recognizer module 304 uses the above qualification parameter(s) to determine an identity of the vendor.

Vendor recognizer module 304 can applies clustering based off access methods/API paths as a signal to associate with a vendor. On similar lines it also does request/response schema clustering to obtain vendor association. Additionally, Vendor recognizer module 304 can profiles the following key dimensions for every vendor: vendor identity, vendor location, vendor Access frequency, API paths, API methods, request Response schemas, PII data transacted with vendors, etc. Vendor recognizer module 304 can use these dimensions to address key use cases around vendor data abuse. Vendor recognizer module 304 can use process 400 to determine an identity of a vendor.

Figure 4:
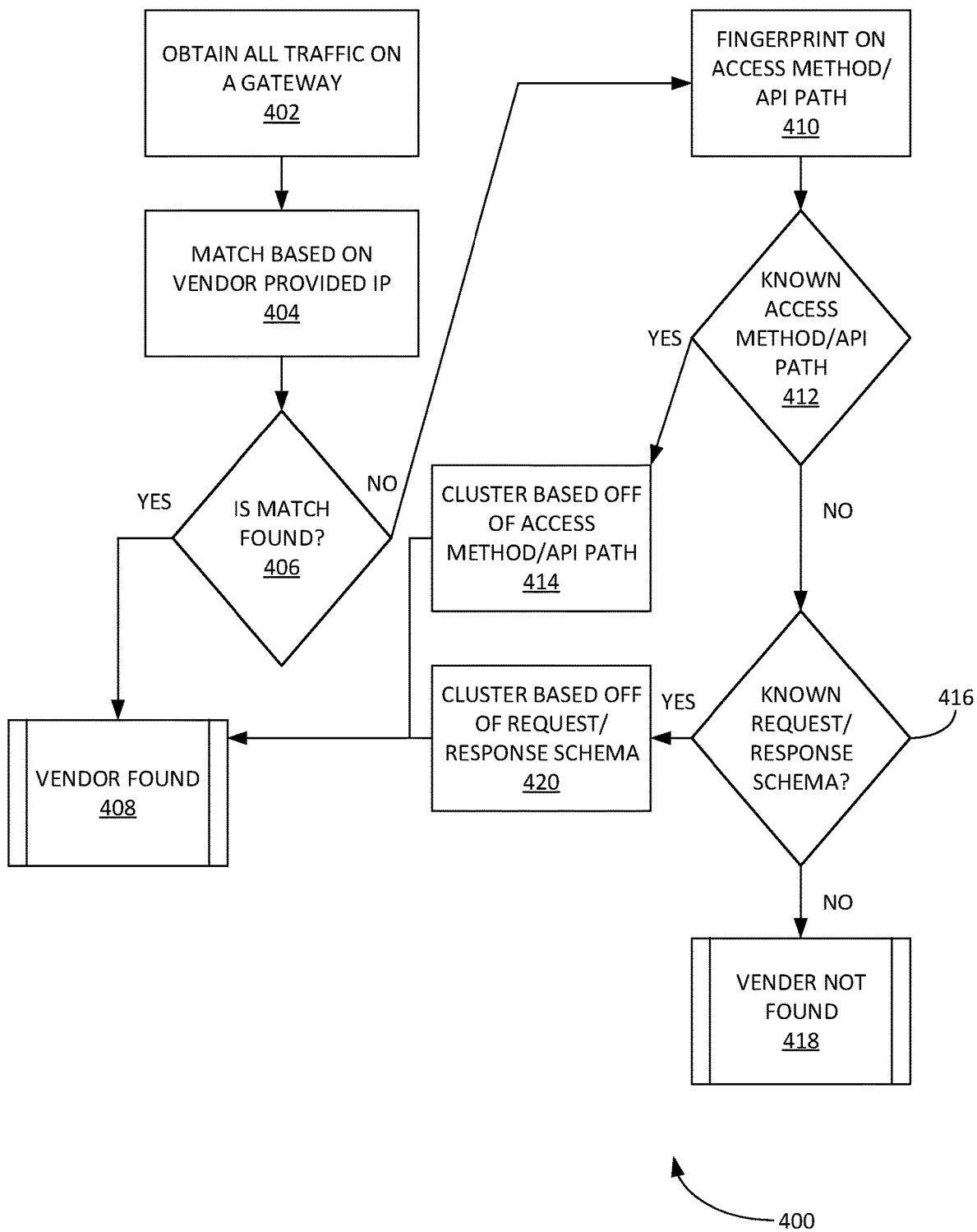
FIG. 4 illustrates an example vendor recognizer module process, according to some embodiments.

FIG. 4 illustrates an example vendor recognizer module process 400, according to some embodiments. In step 402, process 400 obtains all traffic on a gateway. In step 404, process 400 implements a match based on a vendor provided Internet Protocol (IP) identifier. In step 406, process 400 can determine if a match if found. If a match is found then process 400 proceeds to step. In step 408, process 400 determines/finds the vendor.

If no match is found in step 406, process 400 proceeds to step 410. In step 410, process 400 puts the fingerprints on access method/API path. In step 412, process 400 determines if there is a known known access method/API path. If yes, then process 400 proceeds to step 414.

In step 414, process 400 implements clustering operations based off of the access method/API path. Process 400 then proceeds to step 408 and determines/finds the vendor.

If the output of step 412 is negative, the process 400 proceeds to step 416. In step 416, process 400 determines if there is a known request/response schema. If yes, the process 400 proceeds to step 420. In step 420, process 400 to implement clustering operations based off of request/response schema. Process 400 then proceeds to step 408 and determines/finds the vendor.

If the output of step 416 is negative, then process 400 proceeds to step 418. In step 418, process 400 determines that the vender is not found.

Example Use Cases

A data minimization use case is now discussed. If a vendor is a billing vendor and the enterprise is sharing information with said vendor, process 400 can profile the vendor generate an alert based on the data that is being shared with the vendor. In one example, the vendor can be involved with a profiled out of a data breach kill chain. A billing vendor had access to an SSN, first and last name, home address, date of birth, insurance policy information, medical record number, invoice number, account balance, and dates of service. In this example, process 400 can inform the enterprise of any unwanted types that are being shared. This approach can be used to prevent a health provider from the data breach and the like.

Figure 5:
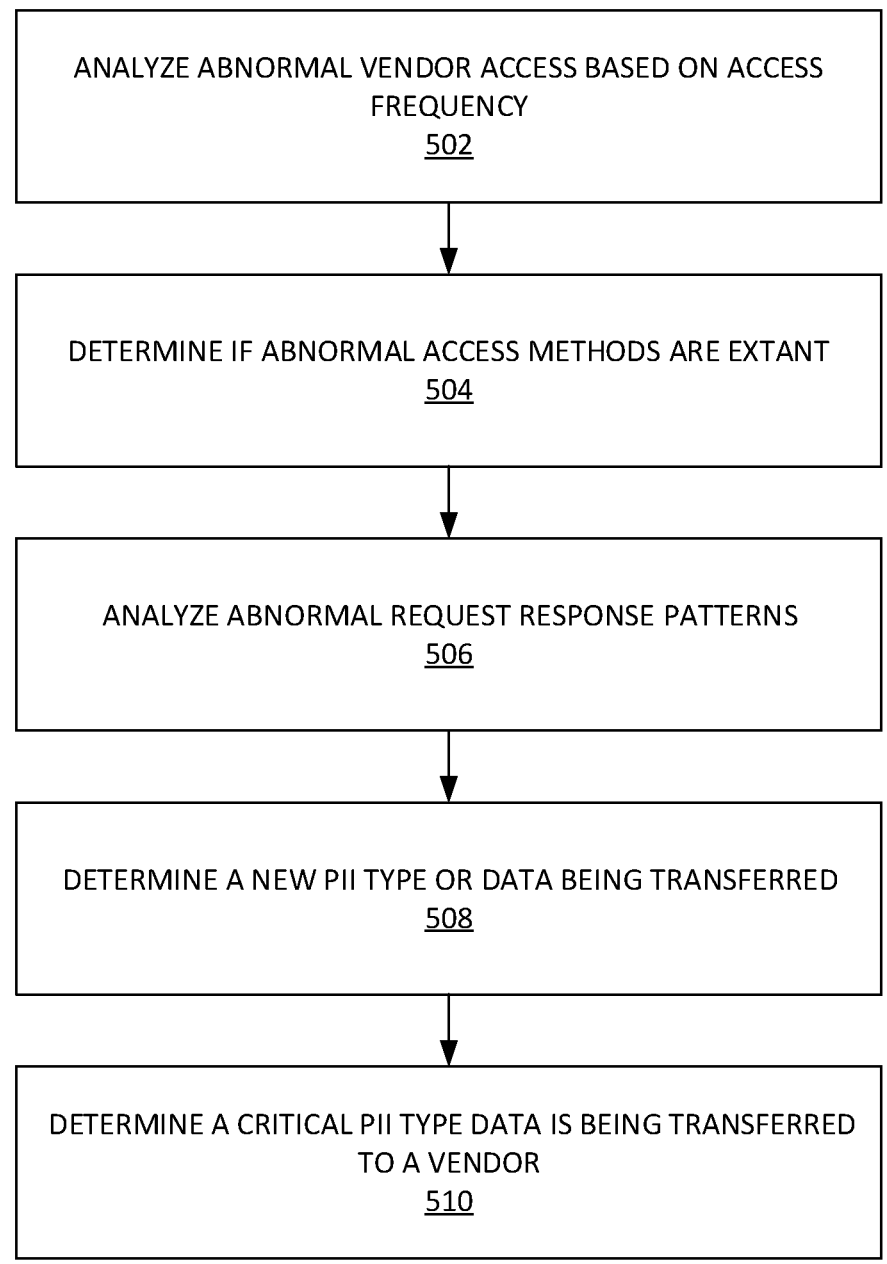
FIG. 5 illustrates an example process for determining abnormal vendor access, according to some embodiments.

FIG. 5 illustrates an example process 500 for determining abnormal vendor access, according to some embodiments. When a vendor has abnormal access based on the following rule-based determinations (as expressed in steps 502-510), process 500 can help the enterprise track such access to prevent any abuse.

In step 502, process 500 analyzes abnormal vendor access based on access frequency. If a vendor access has a different access frequency or random access over a period of time, the risk associated with such an access is noted as high.

In step 504, process 500 determines if abnormal access methods are extant. If a vendor accesses different methods than the normal fingerprinted behavior, process 500 disables access of the risky behavior with any vendor access permissions.

In step 506, process 500 analyzes abnormal request response patterns. For example, if a vendor passes different request patterns than the normal fingerprint, then process 500 does not associate abnormal or risky behavior with such a vendor.

In step 508, process 500 determines a new PII type or data being transferred. If a vendor starts consuming new PII types, process 500 initiates a rule that has such a vendor associated with risky access patterns. This association be used by enterprises to track risky behavior.

In step 510, process 500 determines a critical PII type data is being transferred to a vendor. For example, if a critical PII type (e.g. social security number (SSN), medical record number (MRN), etc.) is sent to a vendor, process 500 allows enterprises to track and fix this issue.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed is:

1. A computerized method for automatically identifying and solving for vendor data abuse in an enterprise network, comprising:
   implementing a vendor detection at one or more gateways of the enterprise network;
   mapping a set of data along with any associated data attributes of the set of data that are being shared with a vendor via the one or more gateways;
   detecting and identifying an access anomaly with respect to the set of data associated with a vendor access; and
   implementing a specified data minimization process to the access anomaly,
   wherein the data minimization process is applied for every vendor sharing agreement engaged in by the enterprise network that is associated with the vendor, and
   wherein data minimization is implemented by prohibiting a vendor access to any sensitive data in the enterprise network.

2. The computerized method of claim 1, wherein the data minimization processes comprises setting a limit to a use or a retention of the set of data by limiting a data collected by protocol elements to only what is necessary.

3. The computerized method of claim 1, wherein data minimization is implemented by:
   limiting data collection by the vendor.

4. The computerized method of claim 3, wherein data minimization is implemented by:

detecting and identifying a violated data minimization scenario committed by the vendor.

5. The computerized method of claim 4 further comprising:
communicating the violated data minimization scenario to the enterprise network.

6. The computerized method of claim 1, wherein the step of implementing the vendor detection at the one or more gateways of the enterprise network further comprises:
identifying the vendor based on an API endpoint data, an API path data, a location data, and a region information data; and
fingerprinting a request and a header information from every vendor.

7. The computerized method of claim 6, wherein the step of implementing the vendor detection at the one or more gateways of the enterprise network further comprises:
building an abnormal access list with respect to an API path and a content of an API for a vendor API key; and
fingerprinting an API endpoint exposed by the vendor.

8. The computerized method of claim 7, further comprising:
fingerprinting a method type to obtain a vendor identification; and
associating the fingerprinted method type with at least one API call from or to the enterprise network.

9. A computer system for automatically identifying and solving for vendor data abuse in an enterprise network, comprising:
a processor;
a memory containing instructions when executed on the processor, causes the processor to perform operations that:
implement a vendor detection at one or more gateways of the enterprise network;
map a set of data along with any associated data attributes of the set of data that are being shared with a vendor via the one or more gateways;
detect and identify an access anomaly with respect to the set of data associated with a vendor access; and
implement a specified data minimization process to the access anomaly wherein the data minimization process is applied for every vendor sharing agreement engaged in by the enterprise network that is associated with the vendor,
wherein data minimization is implemented by prohibiting a vendor access to any sensitive data in the enterprise network, and
wherein the step of implementing the vendor detection at the one or more gateways of the enterprise network further comprises:
implementing a match based on a vendor provided Internet Protocol (IP) identifier;
if no match is found, then identifying the vendor based on an API endpoint data, an API path data, a location data, and a region information data; and
fingerprinting a request and a header information from every vendor.

10. A computerized method for determining abnormal vendor access:
fingerprinting a vendor behavior of a vendor and setting a normal fingerprint of the vendor behavior;
analyzing an abnormal vendor access based on access frequency of the vendor;
detecting that a vendor access has a different access frequency or a random-access frequency over a specified period of time;
setting a vendor abuse risk associated with the different access frequency or the random-access frequency over a specified period of time as high;
when the vendor abuse risk is set as high, determining that an abnormal access method is extant; and
disabling any vendor access permissions of the vendor associated with an abnormal vendor access frequency,
determines a new personal information (PII) type or PII data being transferred via a gateway in an enterprise network;
detecting that the vendor is consuming the new PII types or PII data; and
disabling any vendor access permissions of the vendor when it is detected that the vendor is consuming the new PII types or PII data;
detecting a critical PII type data is being transferred to the vendor; and
disabling any vendor access permissions of the vendor when it is detected that the vendor is receiving the critical PII type data; and
implementing vendor detection at the gateway of the enterprise network comprising:
implementing a match based on a vendor provided Internet Protocol (IP) identifier;
if no match is found, then identifying the vendor based on an API endpoint data, an API path data, a location data, and a region information data; and
fingerprinting a request and a header information from every vendor.

11. The computerized method of claim 10, further comprising:
detecting an abnormal request response pattern when the vendor passes a different request pattern than the normal fingerprint;
disabling any vendor access permissions of the vendor associated with the abnormal request response pattern.

12. The computerized method of claim 10, wherein the critical PII type data comprises a social security number (SSN) or a medical record number (MRN).

* * * * *